UNITED STATES PATENT OFFICE.

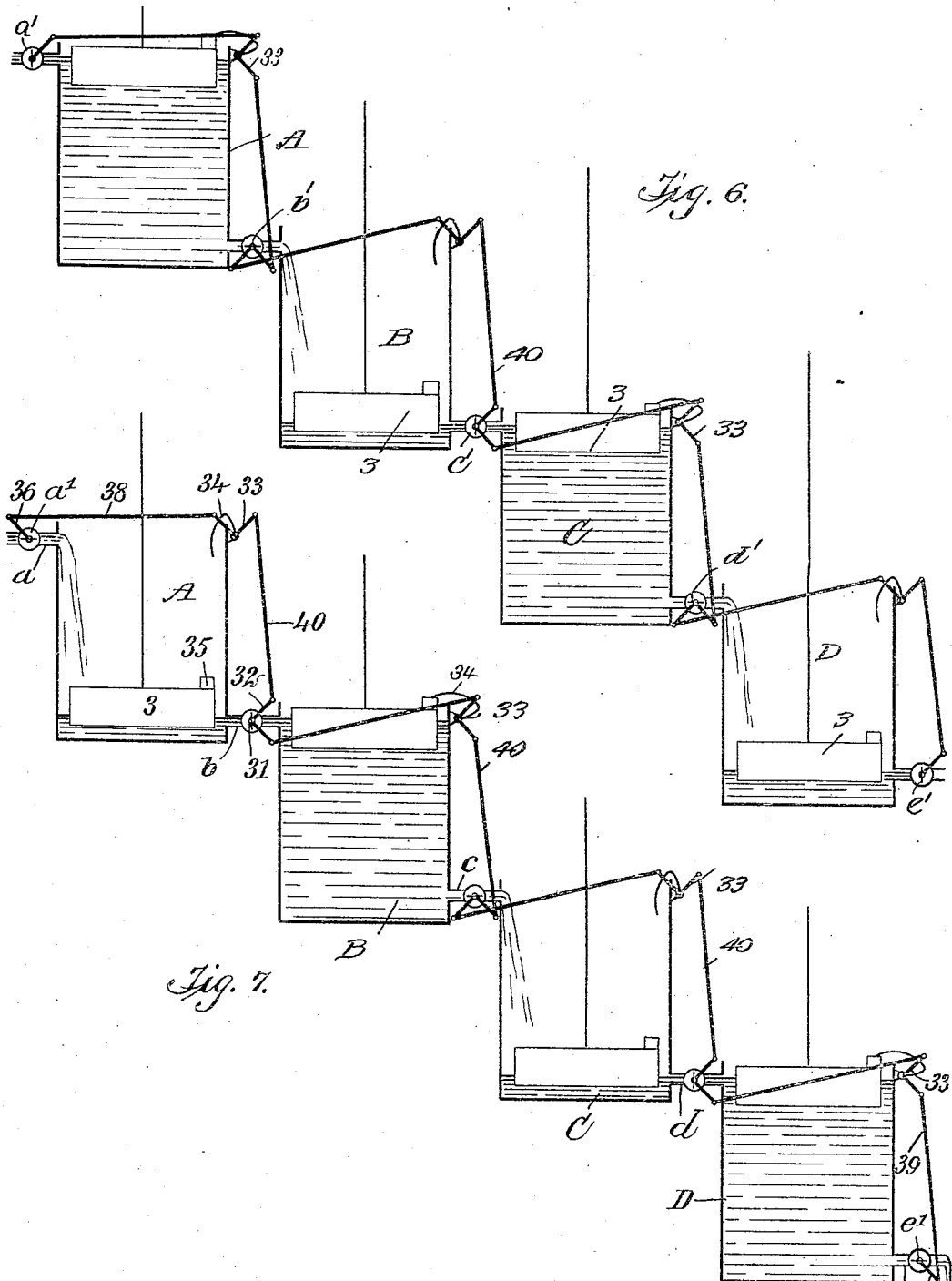

WILLIAM JOHN WHITE, OF OYSTER BAY, NEW YORK.

WATER-MOTOR.

943,501.         Specification of Letters Patent.     Patented Dec. 14, 1909.

Application filed August 15, 1908. Serial No. 448,728.

*To all whom it may concern:*

Be it known that I, WILLIAM J. WHITE, a citizen of the United States, and a resident of Oyster Bay, Center Island, in the county of Nassau and State of New York, have invented a new and Improved Water-Motor, of which the following is a full, clear, and exact description.

This invention relates to water motors.
The object of the invention is to produce a motor which will be adapted to utilize a small current of water having sufficient head so that a considerable power can be derived.

More specifically the invention contemplates an arrangement of tanks or reservoirs in which the water level rises and falls continuously. In these tanks or reservoirs floats are provided which rise and fall with the water level. In rising they operate by their buoyancy through suitable mechanism to produce energy or power, and when the water level has fallen, they operate by gravity to produce power. I provide automatic means for operating the valves which control the flow through these reservoirs or tanks so that the motor operates continuously to develop energy.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
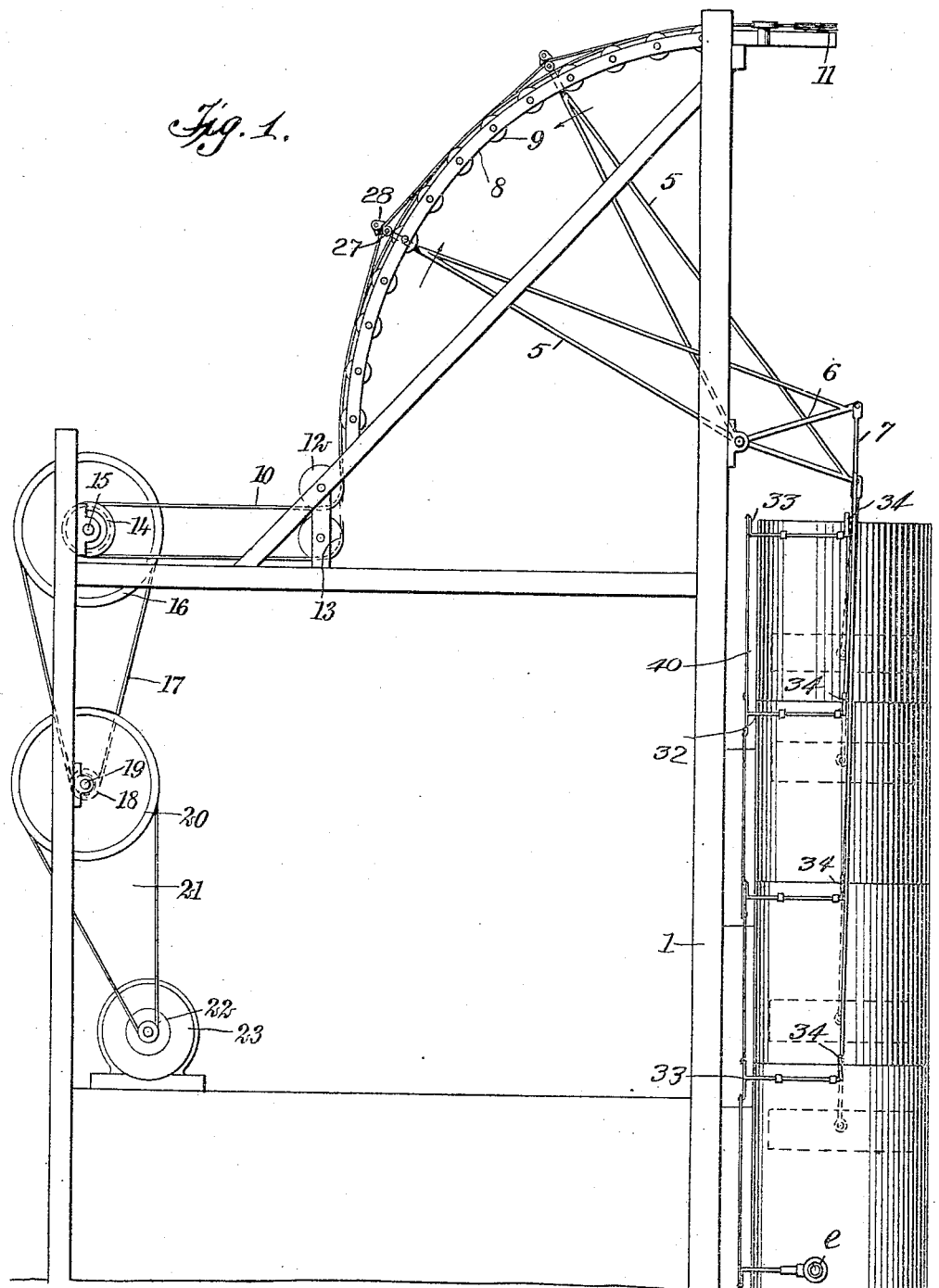
Figure 2:
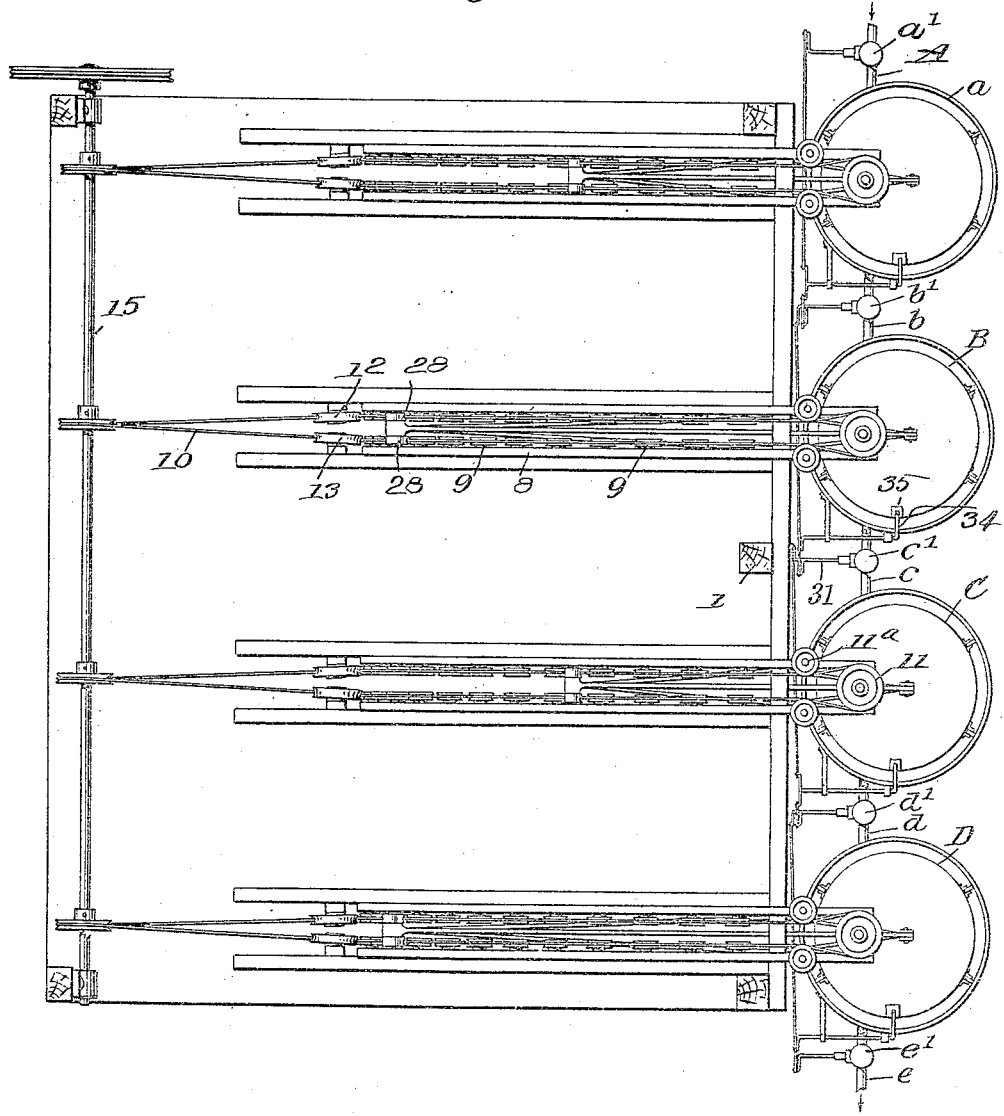
Figure 3:
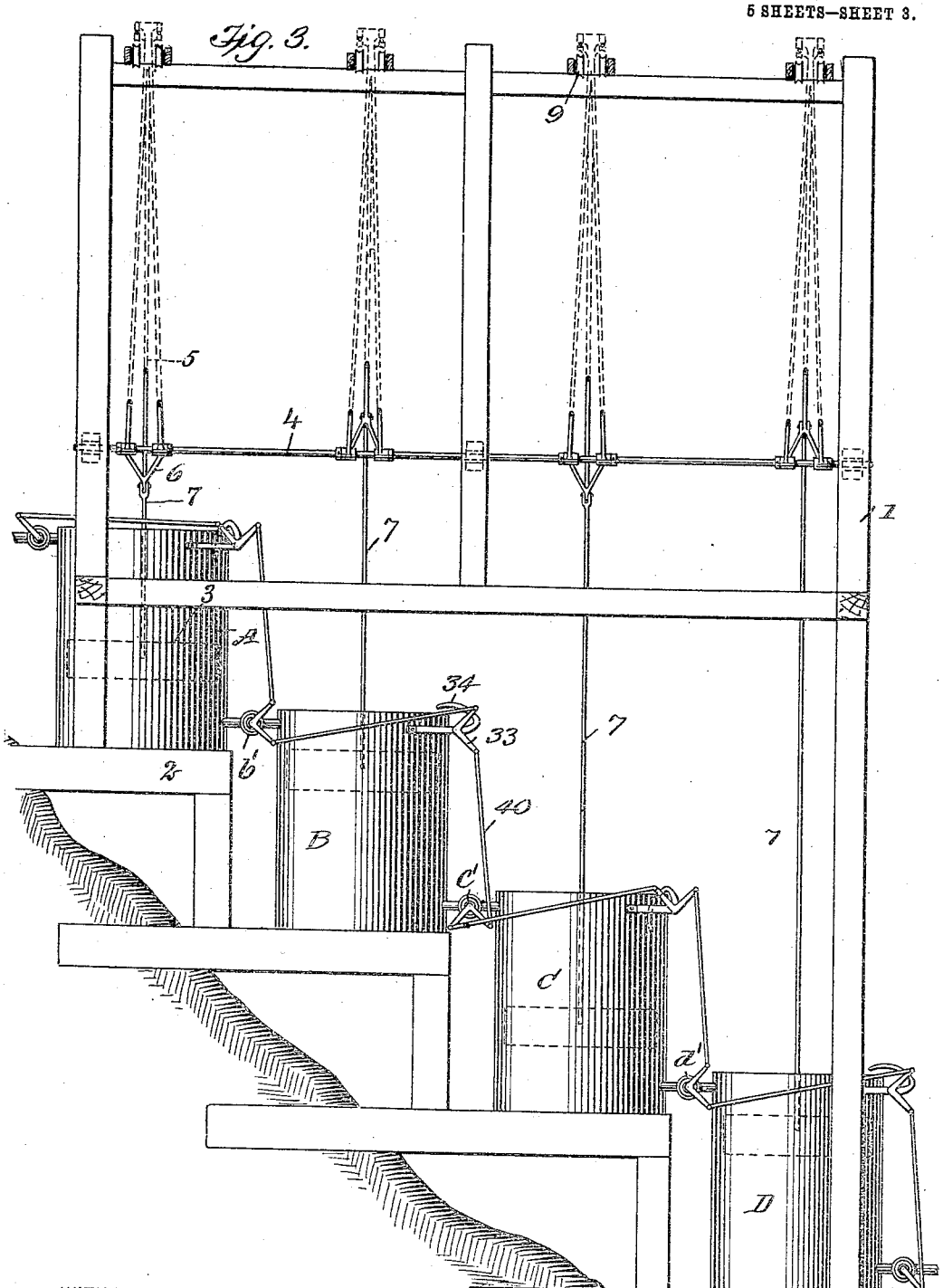
Figure 4:
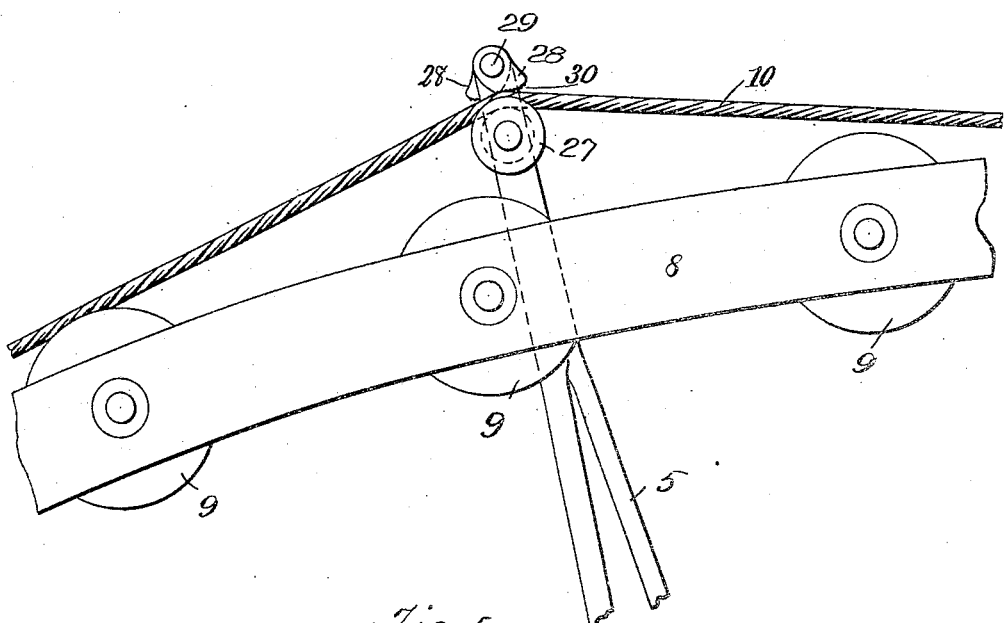
Figure 5:
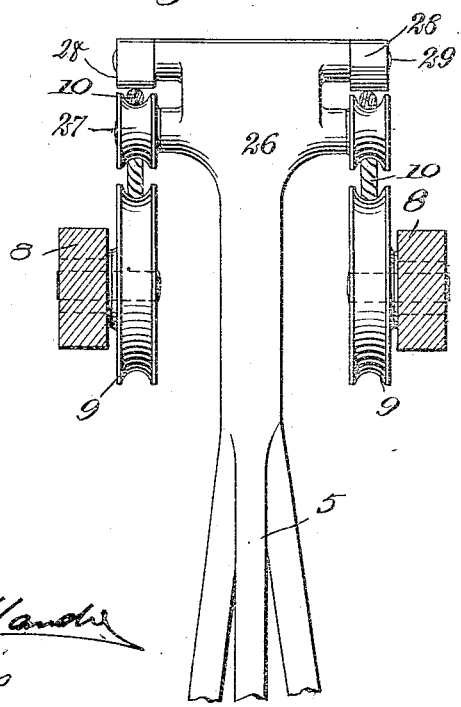

Figure 1 is a side elevation of the motor; Fig. 2 is a plan; Fig. 3 is an elevation showing the tanks or reservoirs, and showing parts of the mechanism of the motor in cross section; Fig. 4 is a side elevation showing in detail a clutch by means of which the sweeps which are operated by the floats grip the operating cables of the motor;
Fig. 5 is a cross section taken through Fig. 4 and further illustrating the details of the cable clutches or grips; Fig. 6 is a diagrammatic view showing the tanks or reservoirs and illustrating the means for controlling the valves thereof; and Fig. 7 is a view similar to Fig. 6, but showing the floats in the position or relation which is the opposite of that shown in Fig. 6.

Referring more particularly to the parts, 1 represents the frame of the motor which is formed of scantling, as shown. At its forward side this frame is constructed so as to present a series of platforms or shelves 2, and on these shelves are supported tanks or reservoirs A, B, C, and D. In these reservoirs, floats 3 are provided which are adapted to rise and fall in the tanks with the level of the water. In the upper part of the frame 1, above the level of these tanks, I provide a main shaft 4 which is disposed in a horizontal position, and on this shaft there are freely mounted sweeps 5. These sweeps have short arms 6 which project over the tanks A, B, C, and D respectively, and are connected with the floats 3 thereof by links 7, as shown. On the upper part of the frame 1, curved guide bars 8 are provided, which are disposed in arcs of equal radius about the axis of the shaft 4 as a center. These guide bars 8 are provided with sheaves 9, the outer edges of which project beyond the curved bars so that they form guide pulleys for endless cables 10; there is one endless cable corresponding to each of the tanks. The upper ends of these cables pass around guide pulleys 11 at the upper ends of the guide bars 8, and across the faces of guide pulleys 11ª adjacent thereto. At the lower ends of the guide bars 8, guide pulleys 12 and 13 are disposed in a vertical position. One side of each endless cable passes under one of the pulleys 12, and the other side under the pulley 13, from this point the endless cables form loops around pulleys 14 which are carried on a horizontal counter-shaft 15 which is supported in the upper part of the frame 1, as shown. This shaft 15 is provided with a rope belt pulley 16 which drives a rope belt pulley 17 connected with a similar pulley 18 operating a second counter-shaft 19 disposed under the shaft 15. In a similar manner the shaft 19 is provided with a large pulley 20 which drives through a rope cable 21.

The construction of the heads 26 of the sweeps is very clearly shown in Figs. 4 and 5. Each sweep projects slightly beyond the guide bars 8 and is expanded into the form illustrated in Fig. 5, that is, it has the form of a double cross head. In the lower part of this cross head, guide pulleys 27 are mounted, which are in alinement with the guide sheaves 9 aforesaid. The outer part of the cross head 26 is provided with a pair of oppositely disposed grips 28 which are respectively in alinement with the pulleys 27. These grips are loosely mounted on pivot pins 29 and are inclined, as indicated in Fig. 4, in opposite directions. Their faces, adjacent to the endless cables 10, are formed with serrated gripping jaws 30. As shown, these jaws incline in opposite directions, the arrangement being such that each grip will permit the cable to pass in one direction, but not in the other direction. As soon as the cable tends to move in a reverse direction the jaw grips or binds it against the pulley 27 opposite. From this arrangement it should be understood that when the head of any particular sweep is moving up, the grip 28 will grab one side of the cable so as to advance it, and when the head is moving downwardly, the grip will grab the other side of the cable so as to advance it. In this way the movement of each sweep is imparted to its corresponding cable, and each cable is advanced constantly in the same direction.

As indicated in Fig. 2, the tank A is supplied through a supply pipe $a$. The tank B is supplied from the bottom of the tank A through a pipe $b$. Similarly a pipe $c$ connects the bottom of the tank B with the tank C, and a similar pipe $d$ connects the bottom of the tank C with the tank D. From the bottom of the tank D an exhaust pipe $e$ extends. In the pipes $a$, $b$, $c$, $d$, etc., valves $a'$, $b'$, $c'$, $d'$ are provided, and a valve $e'$ is provided in the exhaust pipe $e$. These valves are all rotary valves and are moved to their upper or closed position by rotating their stems 31. The stem 31 of each valve is provided with a bell crank lever 32. Near the upper end of each tank, bell crank levers 33 are provided, and these bell crank levers 33 have rigid bent arms 34 which project over into the tanks, as shown. The floats 3 of the tanks are all provided with blocks 35 which are adapted to strike the bent arms so as to actuate the bell crank levers 33 when the floats reach their upper limit of movement. The valves $a'$ and $e'$ are not provided with bell crank levers, but are simply provided with cranks or arms 36 and 37 respectively, as indicated. The arm 36 is connected with one arm of the bell crank lever 33 of the tank A, by a link 38. The arm 37 is connected by a link 39 with the bell crank lever 33 of the tank D. All the intermediate bell crank levers are connected by links 40 in the manner indicated diagrammatically in Figs. 6 and 7.

In the relation of the parts shown in Fig. 6, the tank A is full, and its float 3 has reached the upward limit of its movement. When this occurs the bent arm 34 at the upper edge of the tank A is struck by the block 35 and rotates the bell crank lever 33 of this tank into the position in which it is shown in Fig. 6. This movement closes the valve $a'$, opens the valve $b'$, closes the valve $c'$, opens the valve $d'$, and closes the valve $e'$. The water which has accumulated then in the tank A flows through the pipe $b$ to tank B, and the water in the tank C flows through into the tank D. In this way the tanks A and C eventually become empty, while the tanks B and D become full. As shown, the tanks are arranged at successive levels, the bottom of the tank A being substantially on a level with the tank B, and so on. When the tanks B and D are full, their blocks 35 strike the bent arms 34 which are carried by their bell crank levers 33, and this movement rotates the valves back to the former position, that is, to the relation shown in Fig. 7. This re-opens the valves $e'$, $c'$, and $a'$, and the cycle is complete. From this arrangement it will be seen that a stream of water flowing into the tank A not only operates the float in that tank, but flows on from that tank into the lower tanks so as to operate their floats in the same manner. The action of the valve is entirely automatic so that the direction of movement of the floats reverses at the upper and lower water levels of the tanks. In this way a comparatively small stream can be utilized to produce a continuous movement of the floats, and this continuous movement of the floats is imparted through the sweeps to the endless cables. On account of the great length of the main arm of each sweep as compared with its short arm, the movement of each float is greatly multiplied in imparting motion to the endless cable with which each connects. This gives a greatly increased motion to the endless cables 10 and the movement which is imparted to these endless cables is multiplied through the cables 17 and 21 till it reaches the shaft 22. In this way the dynamo will be driven at a very high velocity.

It will be observed that the arrangement of the valves which control the tanks is an alternate or opposite one. When the supply valve for any one tank is open, its exhaust valve will be closed. Attention is called also to the fact that the same water that operates the tank A also operates the remainder of the tanks. In this way the motor is economical of the water supply. It will be observed any number of tanks can be added, the only requirement being the first tank.

Attention is called to the fact that the guide pulleys 27 on the head of the sweeps are disposed beyond the sheaves 9 longitudinally in alinement therewith. From this arrangement the sheaves 9 in no way hinder the free movement of the sweeps as the pulleys 27 simply lift the cables off of the sheaves as the sweeps move to and fro, as indicated in Fig. 4.

Having thus described my invention, I claim as new and desire to secure by Letters Patent,—

1. In a water motor, in combination, a plurality of tanks, means for supplying water thereto, floats in said tanks and adapted to rise and fall with the change of water level therein, a plurality of valves controlling the flow to and from said tanks, a plurality of endless cables corresponding with said tanks, automatic means for actuating said valves, and mechanism connecting said floats respectively with said cables for advancing said cables.

2. In a water motor, in combination, a plurality of tanks, means for supplying water thereto, means for draining said tanks whereby the water level therein will rise and fall, floats mounted in said tanks respectively, a plurality of cables corresponding with said tanks, sweeps connected with said floats and actuated thereby, and grips carried by said sweeps for engaging said cables.

3. In a water motor, in combination, a plurality of tanks, means for supplying water thereto, means for draining said tanks whereby the water level therein will rise and fall, floats mounted in said tanks respectively, a plurality of cables corresponding with said tanks, sweeps connected with said floats and actuated thereby, grips carried by said sweeps for engaging said cables, and a common shaft to which all of said cables connect, said common shaft being rotated thereby.

4. In a water motor, in combination, a plurality of tanks, means for supplying water thereto, means for draining said tanks whereby the water level in said tanks will rise and fall, a plurality of sweeps corresponding to said tanks, a plurality of endless cables, means for guiding said endless cables adjacent to said sweeps, grips carried by said sweeps and adapted to engage said cables with either direction of movement of said sweeps, and mechanism driven by said endless cables.

5. In a water motor, in combination, a plurality of tanks, means for admitting water to said tanks, means for draining said tanks whereby the water level will rise and fall therein, a plurality of floats mounted respectively in said tanks, a plurality of sweeps connected respectively with said floats, a plurality of endless cables corresponding to said tanks, means for guiding said endless cables adjacent to said sweeps, and clutches carried by said sweeps and engaging one side of said cables for one direction of movement for said sweeps and engaging the other side of the said cables for the other direction of movement of said sweeps.

6. In a water motor, in combination, a plurality of tanks disposed at successive levels, valves connecting said tanks, a valve admitting to the tank at the highest level, a valve controlling the exhaust from the tank at lowest level, mechanism connecting the said valves for operating the same in unison, floats mounted in said tanks, mechanism actuated by said floats, and automatic means for actuating said valves from said floats.

7. In a water motor, in combination, a plurality of tanks arranged at a succession of levels and adapted to drain from one to the next, a plurality of floats mounted respectively in said tanks, a plurality of sweeps connected respectively with said floats and actuated thereby, mechanism actuated by said sweeps for developing power, and means for controlling the flow of water to and from said tanks.

8. In a water motor, in combination, a plurality of tanks disposed at successive levels, a plurality of floats mounted respectively in said tanks, a plurality of sweeps connected respectively with said floats, a plurality of endless cables corresponding to said sweeps, clutches carried by said sweeps and operating said cables in either direction of movement of said sweeps, a common shaft driven by said cables, and automatic means for controlling the admission of water and the flow from said tanks.

9. In a water motor, in combination, a tank, a float movably mounted therein, an endless cable, a sweep having a grip adapted to engage said cable in one direction of movement and adapted to release the cable in an opposite direction of movement, means for guiding said endless cable, means for filling and draining said tank to raise and lower said float, and means for actuating said sweep by said float.

10. In a water motor, in combination, a tank, a float adapted to rise and fall with the water level in said tank, means for admitting and means for controlling the admission and exhaust of the water from said tank, a sweep actuated by said float, an endless cable guided adjacent to said sweep, and a clutch having a grip adapted to engage one side of said cable and a grip adapted to engage the other side of said cable, said grips being oppositely disposed and affording means for advancing one side of said cable in one direction of movement of said sweep and the other side of said cable in the other direction of movement of said sweep.

11. In a water motor, in combination, a sweep, hydraulic means for actuating said sweep, an endless cable, means for guiding said endless cable adjacent to the end of said sweep, said sweep having pulleys receiving said cables, a pair of cable grips carried by said sweep and coöperating respectively with said pulleys, one of said cable grips being adapted to grab the cable in one direction of movement and the other of said grips being adapted to grab the cable in the other direction of movement.

12. In a water motor, in combination, a sweep, hydraulic means for actuating said sweep, curved guide bars disposed adjacent to the end of said sweep, guide sheaves carried by said guide bars, an endless cable running on said sheaves, guide pulleys carried by said sweep and disposed beyond said sheaves whereby said pulleys may remove said cable from said sheaves, and cable grips carried by said sweeps and engaging said cables.

In testimony whereof I have signed my name to this specification in the presence of two subscribing witnesses.

WILLIAM JOHN WHITE.

Witnesses:
   HELEN S. WHITE,
   T. C. GRAHAME.